United States Patent
Lin et al.

(10) Patent No.: US 10,364,896 B2
(45) Date of Patent: Jul. 30, 2019

(54) VALVE PLUG ASSEMBLY FOR PRESSURE REGULATOR

(71) Applicant: EMERSON PROCESS MANAGEMENT REGULATOR TECHNOLOGIES, INC., McKinney, TX (US)

(72) Inventors: Chun Lin, McKinney, TX (US); Roy R. Pelfrey, Sherman, TX (US)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 0 days.

(21) Appl. No.: 15/456,161

(22) Filed: Mar. 10, 2017

(65) Prior Publication Data

US 2018/0259074 A1 Sep. 13, 2018

(51) Int. Cl.
| | |
|---|---|
| *F16K 1/36* | (2006.01) |
| *F16K 1/12* | (2006.01) |
| *F16K 1/46* | (2006.01) |
| *G05D 16/06* | (2006.01) |

(52) U.S. Cl.
CPC .............. *F16K 1/36* (2013.01); *F16K 1/12* (2013.01); *F16K 1/46* (2013.01); *F16K 1/465* (2013.01); *G05D 16/0638* (2013.01); *Y10T 137/5283* (2015.04); *Y10T 137/6082* (2015.04)

(58) Field of Classification Search
CPC ... F16K 1/36; F16K 1/12; F16K 1/465; Y10T 137/6082; Y10T 137/5283

USPC ..................................................... 137/315.32
See application file for complete search history.

(56) References Cited

U.S. PATENT DOCUMENTS

| | | | |
|---|---|---|---|
| 2009/0065073 A1* | 3/2009 | Davis ........................ | F16K 1/36 137/505 |
| 2010/0270490 A1 | 10/2010 | Roper et al. | |
| 2014/0174565 A1* | 6/2014 | Yunxia et al. .......... | F16K 17/04 137/505 |
| 2015/0285402 A1 | 10/2015 | Roper et al. | |

OTHER PUBLICATIONS

International Search Report and Written Opinion, corresponding to International Application No. PCT/US2018/020231, dated May 30, 2018.

* cited by examiner

*Primary Examiner* — Kevin L Lee
(74) *Attorney, Agent, or Firm* — Marshall, Gerstein & Borun LLP

(57) ABSTRACT

A valve plug adapted for sealing engagement with a seat ring. The valve plug includes a cylindrical body with an annular flange having a groove. A pair of bores is disposed in the body, each bore having a first diameter, a first end, and a second end disposed within the body. Each bore is also adapted to receive a fastener to couple the valve plug to a mounting portion, and a recess is disposed at the second end of the bore, forming a stepped portion. The recess is adapted to receive at least one of a portion of a retainer or a portion of the fastener. A sealing disk is disposed within the groove of the annular flange and is one of a machined sealing disk or a molded sealing disk.

20 Claims, 3 Drawing Sheets

VALVE PLUG ASSEMBLY FOR PRESSURE REGULATOR

FIELD OF THE DISCLOSURE

The present disclosure generally relates to fluid control devices and, more particularly, to valve plug assembly for a fluid control device.

BACKGROUND

Fluid control devices include various categories of equipment with control valves and regulators. Such control devices are adapted to be coupled within a fluid process control system such as chemical treatment systems, natural gas delivery systems, etc., for controlling the flow of a fluid therethrough. Each control device includes a body defining a fluid flow-path and a control member assembly for adjusting a dimension of the flow-path. A seat ring is disposed within a throat of the valve body.

The control member assembly typically includes a valve plug assembly having a sealing disk with a sealing surface. When the outlet pressure of the valve body is high, a sealing surface of the sealing disk may sealingly engage the seat ring and close the throat. This prevents the flow of fluid through the regulator. In one example, the sealing disk may be a machined sealing disk used with the regulator, and in another example, the sealing disk may be a molded sealing disk.

More specifically, FIG. 1 depicts one known valve plug assembly 10. In this example, the valve plug assembly 10 is attached to a mounting member, such as a disk holder 12 or a sleeve adapter, for example, which is coupled to a sleeve 14. The valve plug assembly 10 includes a machined, polyurethane sealing disk 16 with a sealing surface 17. The machined sealing disk 16 is coupled to the disk holder 12 by a retainer 18. Screws 20 and washers 22 secure the retainer 18 and the sealing disk 16 to the disk holder 12, for example, but other fasteners may alternatively be used.

FIG. 2 depicts another known valve plug assembly 100. In this example, the valve plug assembly 100 is again attached to a mounting member, such as a disk holder 112, or sleeve adapter, which is coupled to a sleeve 114. The valve plug assembly 100 includes a molded nitrile rubber, such as NBR, sealing disk 116 having a sealing surface 117. The molded sealing disk 116 is coupled to a retainer 130 having a different geometric configuration than the retainer 18 of FIG. 1, for example. Screws 132 and washers 134 again secure the retainer 130 and the sealing disk 116 to the disk holder 112, but other fasteners may again be used. In this example, a seat ring 136 is depicted, which is adapted to be in contact with the sealing surface 117 of the sealing disk 116.

As described, the machined sealing disk 16 depicted in FIG. 1 and the molded sealing disk 116 of FIG. 2 require different retainers 18, 130 be used to secure the sealing disks 16, 116, respectively, to the disk holders 12, 112, for example. In addition, while screws 20, 132 and nuts 22, 134 are both used to secure the retainers 18, 130 to the disk holders 12, 112, often the retainers 18, 130 require a different number and kind of screws 20, 132 and/or nuts 22, 134. Such variations in the retainers 18, 130 and corresponding screws 20, 132 and nuts 22, 134 used for each of the machined sealing disk 16 and the molded sealing disk 116, respectively, makes service of such disks 16, 116 more complicated. Said another way, servicing the sealing disks 16, 116 requires a user to know whether the valve plug assembly 10, 100 includes the machined sealing disk 16 or the molder sealing disk 116 so that a required corresponding retainer and screws and nuts are used, for example.

In addition, and as depicted in FIG. 1, an additional o-ring 24 or similar sealing mechanism is required to be disposed adjacent to the machined sealing disk 16 between the retainer 18 and the disk holder 12. This additional o-ring 24 used with the machined sealing disk 16 is not required or needed with the molded sealing disk 116 depicted in FIG. 2, for example. Thus, a user replacing or servicing the machined sealing disk 16 would need to make sure an additional and proper o-ring 24 or similar sealing mechanism was also included during installation and/or after replacing, repairing and/or servicing the sealing disk 16, for example.

SUMMARY OF THE DISCLOSURE

One aspect of the present disclosure includes a valve plug adapted for sealing engagement with a seat ring. The valve plug comprises a cylindrical body with an annular flange radially extending from the body and having a groove. A pair of bores is disposed one or more of on or in the body, each bore having a first diameter, a first end adapted to be in contact with a mounting portion, and a second end disposed within the body. In addition, each bore is adapted to receive a fastener to couple the valve plug to the mounting portion. A recess is disposed at the second end of each bore, and each recess has a second diameter larger than the first diameter of the bore to form a stepped portion at the second end of each bore. The recess is adapted to receive at least one of a portion of a retainer or a portion of the fastener. A sealing disk is disposed within the groove of the annular flange. The sealing disk is one of a machined sealing disk that is machined into the groove or a molded sealing disk that is molded to the groove and has a sealing surface adapted to engage a seating surface of the seat ring. So configured, when the sealing disk is the machined sealing disk, the recess receives a portion of a retainer, and when the sealing disk is the molded sealing disk, the recess receives a portion of the fastener. In this way, the same valve plug and one or more fasteners are interchangeably used with both the machined sealing disk and the molded sealing disk.

According to another aspect of the present disclosure, a fluid control device, comprises a valve body defining a flow path for a fluid, a seat ring disposed within the flow path; and an actuator coupled to the valve body. The actuator includes a control assembly adapted for displacement relative to the seat ring for regulating a flow of the fluid through the flow-path. The control assembly includes a mounting portion and a valve plug coupled to the mounting portion and adapted to sealingly engage the seat ring. The valve plug comprises a cylindrical body and an annular flange radially extending from the cylindrical body, the annular flange having a groove. In addition, the valve plug includes a pair of bores disposed in the cylindrical body, each bore having a first diameter, a first end in contact with the mounting portion, and a second end disposed within the cylindrical body. Further, each bore is adapted to receive a fastener to couple the valve plug to the mounting portion. A recess is disposed at the second end of each bore, and each recess has a second diameter larger than the first diameter of the bore to form a stepped portion at the second end of each bore. Further, the recess is adapted to receive at least one of a portion of a retainer or a portion of the fastener. In addition, a sealing disk is disposed within the groove of the annular flange. The sealing disk is one of a machined sealing disk that is machined into the groove or a molded sealing disk that is molded to the groove and has a sealing surface adapted to engage a seating surface of the seat ring.

In further accordance with any one or more of the foregoing first and second aspects, the valve plug may include any one or more of the following forms.

According to one aspect, the sealing disk may comprise polyurethane at least in part, and the valve plug may comprise a metal material. In addition, the sealing disk may comprise the machined sealing disk, and further include a gasket disposed within the groove between the flange and the machined sealing disk.

According to another aspect, the flange may include a top surface adapted to contact the disk holder and a bottom surface, and the groove may extend into the bottom surface of the flange. In addition, the body may include a top surface and a bottom surface, the first end of each bore at the top surface of the body, and the second end of each bore disposed within the body a distance from the bottom surface of the body.

In yet another aspect, the recess may be a screw head recess adapted to receive a screw head of the fastener. In addition, the screw head of the fastener may be moved out of a flow path to improve stability of a regulator.

In still another aspect, the sealing disk may include the molded sealing disk, and the fastener may then couple the valve plug to the mounting portion without a retainer. When the sealing disk is the molded sealing disk, the molded sealing disk may comprise a nitrile material at least in part, and the valve plug may comprise a metal material.

In another aspect, the distance between each bore in the valve plug may be the same. Said another way, each bore in the valve plug may be equidistant from the other bore.

In addition, the when the sealing disk is the machined sealing disk, the control device may further comprise a retainer in contact with the valve plug to secure the valve plug to the mounting portion. A portion of the retainer may be disposed within the recess of the valve plug, and a screw head of the fastener may be disposed within the retainer. Further, the retainer may also include a portion in contact with the sealing surface of the valve plug.

In yet another aspect, when the sealing disk is the machined sealing disk, the recess may receive a portion of a retainer, and when the sealing disk is the molded sealing disk, the recess may receive a portion of the fastener, such that the same valve plug and one or more fasteners are interchangeably used with both the machined sealing disk and the molded sealing disk.

BRIEF DESCRIPTION OF THE DRAWINGS

It is believed that the disclosure will be more fully understood from the following description taken in conjunction with the accompanying drawings. Some of the drawings may have been simplified by the omission of selected elements for the purpose of more clearly showing other elements. Such omissions of elements in some drawings are not necessarily indicative of the presence or absence of particular elements in any of the example embodiments, except as may be explicitly delineated in the corresponding written description. Also, none of the drawings is necessarily to scale.

DETAILED DESCRIPTION OF THE DISCLOSURE

A valve plug adapted for sealing engagement with a seat ring is disclosed. The valve plug includes a cylindrical body and an annular flange extending from the body, the annular flange having a groove. A pair of bores is disposed in the cylindrical body, each bore having a first end adapted to be in contact with a mounting portion, a second end disposed within the body, and adapted to receive a fastener to couple the valve plug to the mounting portion. A recess is disposed at the second end of each bore and is adapted to receive at least one of a portion of a retainer or a portion of the fastener. A sealing disk is disposed within the groove of the annular flange, the sealing disk one of a machined sealing disk or a molded sealing disk, the sealing disk having a sealing surface adapted to engage a seating surface of the seat ring. When the sealing disk is a machine sealing disk, the recess receives a portion of a retainer, and when the sealing disk is a molded sealing disk, the recess receives a portion of the fastener, such that the same valve plug and one or more fasteners are interchangeably used with both the machined sealing disk and the molded sealing disk, requiring fewer parts for installation and service of the valve plug.

Figure 1:
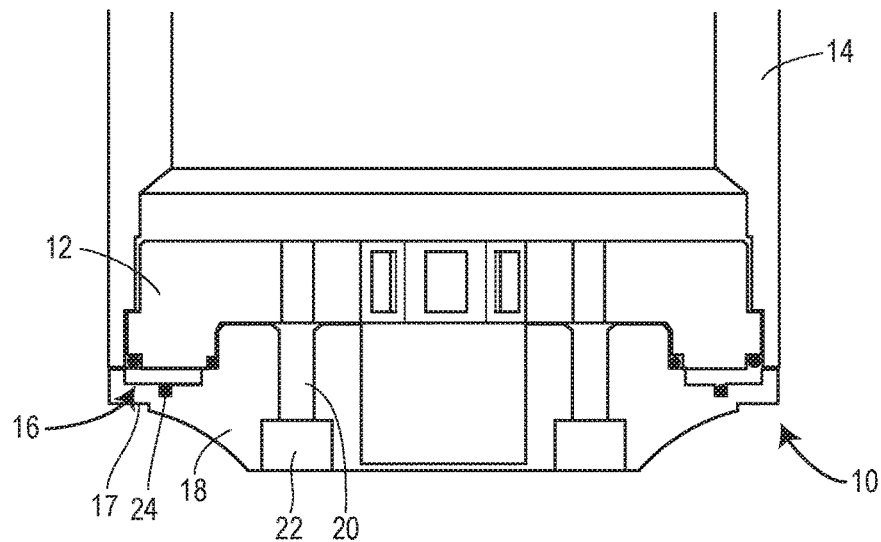
FIG. 1 is a cross-sectional view of a known valve plug assembly having a machined sealing disk adapted to be used with a regulator assembly.
Figure 2:
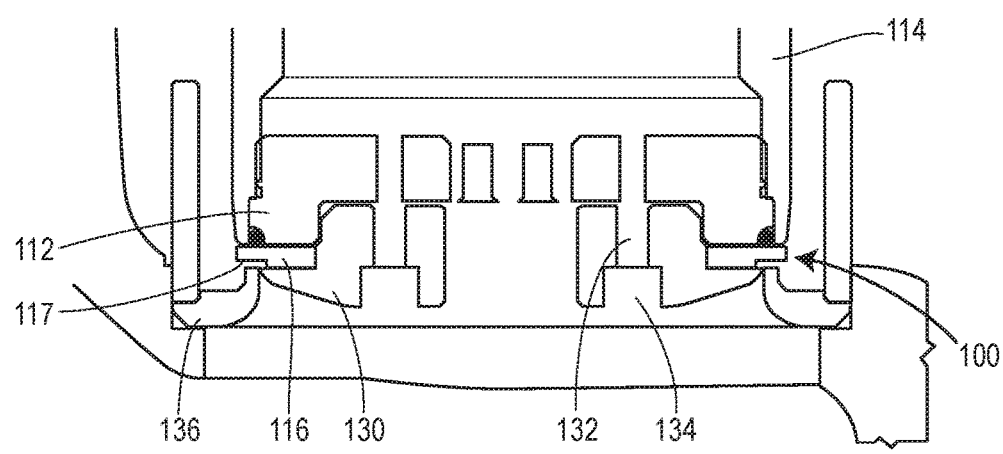
FIG. 2 is cross-sectional view of another known valve plug assembly having a molded sealing disk adapted to be used with a regulator assembly.
Figure 3:
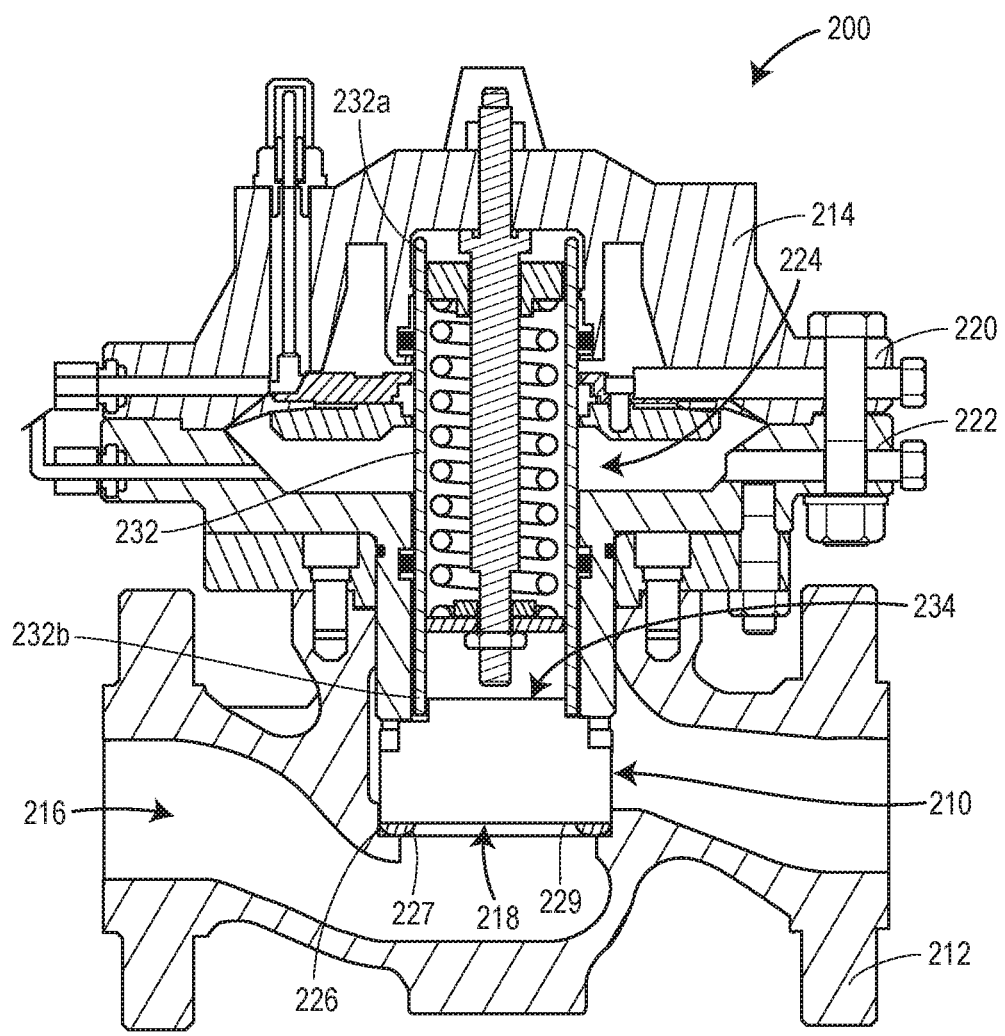
FIG. 3 is a cross-sectional view of a fluid control device having a valve plug assembly according to the present disclosure.

Referring now to FIG. 3, a fluid flow control device or regulator assembly 200 including a valve plug assembly 210 of the present disclosure is depicted. The regulator assembly includes a valve body 212 and an actuator 214. The valve body 212 defines a flow-path 216 and includes a throat 218. In FIG. 3, the regulator assembly 200 is configured in a flow-up configuration. The actuator 214 includes an upper actuator casing 220, a lower actuator casing 222, and a control member assembly 224. The control member assembly 224 is disposed within the upper and lower actuator casings 220, 222 and is adapted for bi-directional displacement in response to changes in pressure across the regulator assembly 200. So configured, the control member assembly 224 controls the flow of fluid through the throat 218. Additionally, as is depicted, the regulator assembly 200 includes a seat ring 226 (depicted in part) disposed in the throat 218 of the valve body 212. When the outlet pressure of the valve body 212 is high, a sealing surface of the control member assembly 224 may sealingly engage the seat ring 226 and close the throat 218, as described more below, to prevent the flow of fluid through the regulator 200.

The seat ring 226 depicted in FIG. 3 further includes a partially rounded or tapered surface 227. The rounded or tapered surface 227 serves to streamline the flow of the fluid through an orifice 229. As fluid flows through the valve body 212, it flows from the left of the valve body 212, as depicted in FIG. 3 and up through the throat 218 via the orifice 229 in the seat ring 226. Then, the fluid deflects off a lower surface of the control member 224, and out to the right of the valve body 212 of FIG. 3.

Generally, the control member assembly 224 is adapted to be engaged by a seating surface 230 (FIGS. 4 and 5) of the seat ring 226 when the control member assembly 224 is in a closed position (not depicted), preventing the fluid from flowing through the valve body 212. More specifically, the control member assembly 224 further includes a tubular member 232, a mounting subassembly 234, and the valve plug assembly 210, e.g., disk holder assembly. The tubular member 232 includes an upper end 232a and a lower end 232b. The lower end 232b is open and accommodates the mounting subassembly 234. The valve plug assembly 210 is coupled to the mounting subassembly 234, for example, as generally depicted in FIG. 3.

Figure 4:
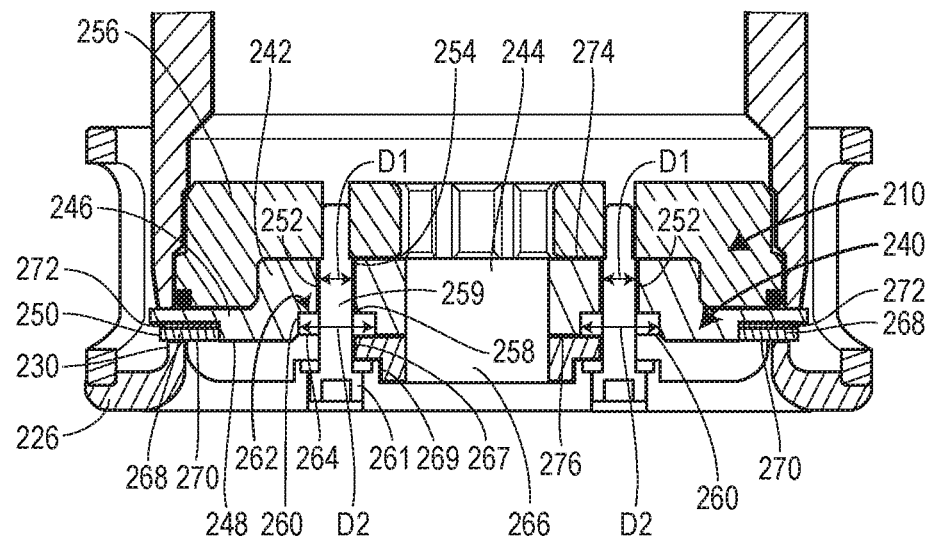
FIG. 4 is a cross-sectional view of the valve plug assembly of FIG. 3, the valve plug assembly having a valve plug with a machined sealing disk.

Referring now to FIG. 4, the valve plug assembly 210 includes a valve plug 240 or a disk holder having a machined sealing disk, as explained more below. The valve plug 240 includes a generally cylindrical body 242 having a center portion 244 and an annular flange 246 radially extending from the body 242. The annular flange 246 includes a bottom portion 248, such as a bottom surface, and an annular groove 250 disposed in the bottom portion 248. At least one bore 252, and in one example, a pair of bores 252 is disposed in the body 242 of the valve plug 240. The pair of bores 252 includes a bore 252 disposed on either side of the center portion 244 of the body, and each bore 252 is equidistant from the other bore 252, as depicted in FIG. 4. The bore 252 also includes a first diameter D1, a first end 254 adapted to be in contact with a mounting portion 256 of the mounting assembly 234 (FIG. 3), and a second end 258 disposed within the body 242. The bore 252 is adapted to receive a fastener 259 to couple the valve plug 240 to the mounting portion 256, for example. In one example, the fastener 259 is a threaded fastener or threaded screw and in another example the fastener is a nail or stud. One of ordinary skill in the art will appreciate that various other fasteners may alternatively be used and still fall within the scope of the present disclosure.

The valve plug 240 further includes a recess 260 disposed at the second end 258 of the bore 252. The recess 260 includes a second diameter D2 larger than the first diameter D1 of the bore 252 to form a stepped portion 262 at the end 258 of the bore 252. In this example, the recess 260 is adapted to receive a portion 264 of a retainer 266.

More specifically, the retainer 266 includes at least one bore 267 that is axially aligned with the bore 252 of the valve plug 240. In addition, the at least one bore 267 of the retainer 266 has a diameter that is substantially identical to the diameter D1 of the bore 252 of the valve plug 240. Further, the retainer 266 also includes at least one recess 269 disposed at one end of the at least one bore 267 of the retainer 266. The recess 269 has a diameter that is substantially identical to the diameter D2 of the recess 260 of the valve plug 240. In this way, the bore 267 of the retainer 266 also receives a portion of the fastener 259, and the recess 269 of the retainer 266 receives a screw head 261 of the fastener 259, for example. In one example, the recess 269 of the retainer 266 is a screw head recess. One of ordinary skill in the art will appreciate that the at least one bore 267 of the retainer 266 may include a pair of bores 267 or a plurality of bores 267, wherein each bore 267 of the retainer 266 is axially aligned with each bore 252 of the valve plug 240, for example, and still fall within the scope of the present disclosure. Further, one of ordinary skill in the art will also appreciate that the at least one recess 269 may include a pair of recesses 269 disposed at the ends of the each bore 267 of a pair of bores 267 and also still fall within the scope of the present disclosure.

Still referring to FIG. 4, the valve plug 240 further includes a sealing disk 268 disposed within the groove 250 of the annular flange 248. In this example, the sealing disk 268 is a machined sealing disk that is machined into the groove 250 and includes a sealing surface 270 adapted to engage the seating surface 230 of the seat ring 226. In this example, the machined sealing disk 268 comprises polyurethane at least in part, and the valve plug 240 comprises a metal material.

In another example, the valve plug 240 may further include a gasket 272 disposed in the groove 250 between the sealing disk 268 and the annular flange 246. The gasket 272 prevents high pressure and air from getting behind the sealing disk 268 in high pressure applications of the regulator assembly 200, which causes moderate to severe unwanted vibrations of the valve plug 240. As a result, the gasket 272 significantly reduces, if not eliminates, any unwanted vibrations due to high pressure and/or air behind the sealing disk 268 during operation of the regulator assembly 200.

As further depicted in FIG. 4, the body 242 of the valve plug 240 further includes a top surface 274 and a bottom surface 276. The first end 254 of the bore 252 is disposed at the top surface 274 of the body 242. The second end 258 of the bore 252 is disposed within the body 242 a distance from the bottom surface 276 of the body 242.

Figure 5:
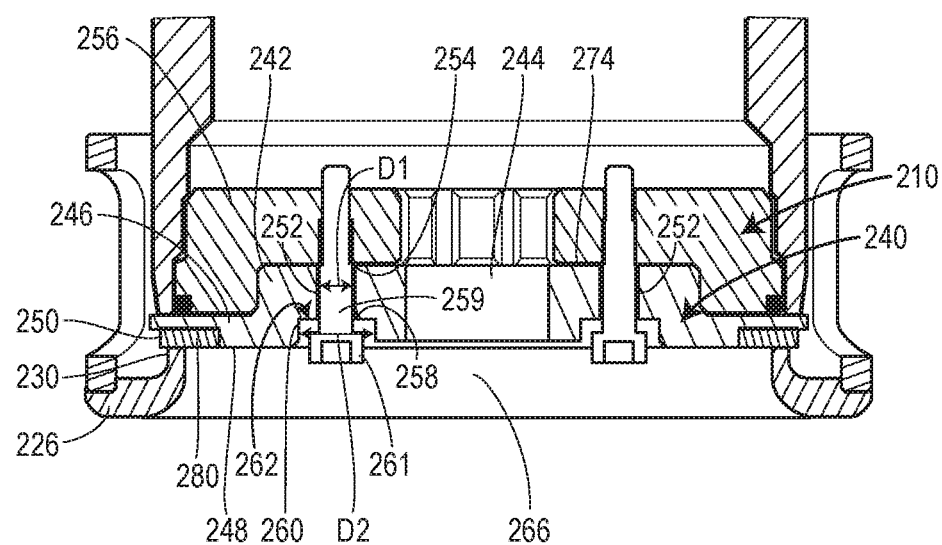
FIG. 5 is cross-sectional view of the valve plug assembly of FIG. 3, the valve plug assembly having a valve plug with a molded sealing disk.

Referring now to FIG. 5, the valve plug assembly 210 is again depicted, the valve plug assembly 210 having the valve plug 240 (or disk holder, for example), but instead of the machined sealing disk 268 (FIG. 4), a molded sealing disk 280 is included within the valve plug 240. Because the valve plug 240 of FIG. 5 is essentially the same as the valve plug 240 of FIG. 4, parts of the valve plug 240 of FIG. 4 identical to the valve plug 240 of FIG. 5 share the same reference numerals and are mostly explained above relative to FIG. 4, for the sake of brevity.

As depicted in FIG. 5, the valve plug 240 includes the cylindrical body 242 with the center portion 244 and the annular flange 246 radially extending from the body 242. The annular groove 250 is disposed in the bottom portion 248 of the annular flange 246 and receives the molded sealing disk 280. The dimensions of the valve plug 240, such as the diameter and the length of the groove 250 in the annular flange 246 of the body 242, fit both the machined sealing disk 268 depicted in FIG. 4 and the molded sealing disk 280 of FIG. 5. This interchangeability of types of sealing disks 268, 280 able to be used with the valve plug 240 of the present disclosure, for example, allows fewer parts to be used in servicing the valve plug 240 of the actuator assembly of FIG. 3, as explained more below.

Still referring to FIG. 5, the bores 252 disposed in the body 242 of the valve plug 240 include the first end 254 adapted to be in contact with the mounting portion 256 of the mounting assembly 234 (FIG. 3), and the second end 258 disposed within the body 242. The bore 252 is again adapted to receive the fastener 259, as described above, to again couple the valve plug 240 to the mounting portion 256, for example.

The recess 260 disposed at the second end 258 of the bore 252 has the second diameter D2 larger than the first diameter D1 of the bore 252 to form the stepped portion 262 at the second end 258 of the bore 252. In this example, however, the recess 260 is adapted to receive a screw head 261 of the fastener 259, as depicted in FIG. 5. More specifically, in this example, the recess 260 is a screw head recess that receives the screw head 261 of the fastener 259, such that the screw head 261 is moved out of the flow path 216 (FIG. 3), improving the stability of the regulator assembly 200. So configured, in this example, no retainer 266 is required to secure the valve plug 240 to the mounting portion 256, for example, as required for the machined sealing disk 268 of FIG. 4. Said another way, the fastener 260 and screw head 261, the screw head 261 fitting directly into the recess 260 of the valve plug 240, couple the valve plug 240 having the molded sealing disk 280 to the mounting portion 256 without any need for a retainer.

While two bores 252 are depicted in FIGS. 4 and 5, one of ordinary skill in the art will appreciate that only one bore 252 and recess 260 or more than two bores 252 and associated recesses 260 may alternatively be used and still fall within the scope of the present disclosure. Likewise, each bore 252 and recess 260 will include corresponding fasteners 260 and screw heads 261.

One of ordinary skill in the art will also appreciate that both the machined sealing disk 268 and the molded sealing disk 280 include a generally ring-shaped disk made of resilient material, such as polyurethane or nitrile rubber, as described above relative to the machined sealing disk 268 and the molded sealing disk 280, respectively. In one example, the machined sealing disk 268 may be fixed or bonded to the valve plug 240 with an adhesive.

One of ordinary skill in the art will further appreciate the various advantages of the valve plug 240 of the present disclosure. For example, using fewer parts than conventional designs, the new valve plug 240 described above allows both the machined sealing disk 268 and the molded sealing disk 280 to use the same valve plug 240 and fasteners 259. As a result, installation and service of the valve plug 240 (and fluid control device) is more efficient and easier to manage than conventional valve plugs, one of which was required for machined sealing disks and another, different valve plug and associated parts were required for molded sealing disks. In addition, both the retainer 266 and valve plug 240 include the recesses 260, 261 for receiving a screw head of the fastener 259, for example. So configured, whether the sealing disk is the machined sealing disk 268 or the molded sealing disk 280, both recesses 260, 261 move the screw head of each fastener 259 out of the flow path 216 (FIG. 3) to improve stability of the regulator.

In light of the foregoing, the description of the present disclosure should be understood as merely providing examples of the present invention and, thus, variations that do not depart from the gist of the invention are intended to be within the scope of the invention.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein any reference to "one example" or "an example" means that a particular element, feature, structure, or characteristic described in connection with the embodiment is included in at least one embodiment. The appearances of the phrase "in one example" in various places in the specification are not necessarily all referring to the same example.

Some examples may be described using the expression "coupled" and "connected" along with their derivatives. For example, some examples may be described using the term "coupled" to indicate that two or more elements are in direct physical or electrical contact. The term "coupled," however, may also mean that two or more elements are not in direct contact with each other, but yet still cooperate or interact with each other. The examples are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

While various embodiments have been described herein, it is understood that the appended claims are not intended to be limited thereto, and may include variations that are still within the literal or equivalent scope of the claims.

What is claimed:

1. A valve plug adapted for sealing engagement with a seat ring, the valve plug comprising:
    a cylindrical body and an annular flange radially extending from the body, the annular flange having a groove;
    a pair of bores disposed in the body, each bore having a first diameter, a first end adapted to be in contact with a mounting portion, and a second end disposed within the body, each bore adapted to receive a fastener to couple the valve plug to the mounting portion;
    a recess disposed at the second end of each bore, each recess having a second diameter larger than the first diameter of the bore to form a stepped portion at the second end of each bore, the recess adapted to receive at least one of a portion of a retainer or a portion of the fastener; and
    a sealing disk disposed within the groove of the annular flange, the sealing disk one of a machined sealing disk machined into the groove or a molded sealing disk molded to the groove, the sealing disk having a sealing surface adapted to engage a seating surface of the seat ring,
    wherein, when the sealing disk is the machined sealing disk, the recess disposed at the second end of each bore disposed in the body receives a portion of a retainer, and when the sealing disk is the molded sealing disk, the recess receives only a portion of the fastener, such that the same valve plug and one or more fasteners are interchangeably used with both the machined sealing disk and the molded sealing disk.

2. The valve plug of claim 1, wherein the machined sealing disk comprises polyurethane at least in part, and the valve plug comprises a metal material.

3. The valve plug of claim 1, the sealing disk comprising the machined sealing disk, and further comprising a gasket within the groove between the annular flange and the machined sealing disk.

4. The valve plug of claim 1, wherein the flange includes a top surface adapted to contact the mounting portion and a bottom surface, the groove extending into the bottom surface of the flange.

5. The valve plug of claim 1, wherein the body includes a top surface and a bottom surface, the first end of each bore at the top surface of the body, and the second end of the each bore disposed within the body a distance from the bottom surface of the body.

6. The valve plug of claim 1, wherein the recess is a screw head recess adapted to receive a screw head of the fastener, such that the screw head of the fastener is moved out of a flow path to improve stability of a regulator.

7. The valve plug of claim 1, the sealing disk comprising the molded sealing disk, and the fastener couples the valve plug to the mounting portion without any retainer.

8. The valve plug of claim 1, wherein the sealing disk is the molded sealing disk, the molded sealing disk comprises a nitrile material at least in part, and the valve plug comprises a metal material.

9. The valve plug of claim 1, wherein a distance between each bore is the same.

10. A fluid control device, comprising:
a valve body defining a flow path for a fluid;
a seat ring disposed within the flow path; and
an actuator coupled to the valve body including a control assembly adapted for displacement relative to the seat ring for regulating a flow of the fluid through the flow-path, the control assembly including a mounting portion and a valve plug coupled to the mounting portion and adapted to sealingly engage the seat ring, the valve plug comprising:
 a cylindrical body and an annular flange radially extending from the cylindrical body, the annular flange having a groove;
 a pair of bores disposed in the cylindrical body, each bore having a first diameter, a first end in contact with the mounting portion, and a second end disposed within the cylindrical body, each bore adapted to receive a fastener to couple the valve plug to the mounting portion;
 a recess disposed at the second end of each bore disposed in the cylindrical body, each recess having a second diameter larger than the first diameter of the bore to form a stepped portion at the second end of each bore, the recess adapted to receive at least one of a portion of a retainer or a portion of the fastener; and
 a sealing disk disposed within the groove of the annular flange, the sealing disk one of a machined sealing disk machined into the groove or a molded sealing disk molded to the groove, the sealing disk having a sealing surface adapted to engage a seating surface of the seat ring.

11. The control device of claim 10, wherein the machined sealing disk comprises a polyurethane material at least in part, the molded sealing disk comprises a nitrile material at least in part, and the valve plug comprises a metal material.

12. The control device of claim 10, wherein the sealing disk comprises the machined sealing disk, and the groove further comprises a gasket disposed within a portion of the groove between the annular flange and the machined sealing disk.

13. The control device of claim 10, wherein the annular flange includes a top surface adapted to contact a mounting member and a bottom surface, the groove extending into the bottom surface of the annular flange.

14. The control device of claim 10, wherein the body includes a top surface and a bottom surface, the first end of each bore disposed at the top surface of the body, and the second end of the each bore disposed within the body a distance from the bottom surface of the body.

15. The control device of claim 10, wherein the recess is a screw head recess adapted to receive a screw head of the fastener.

16. The control device of claim 10, wherein the sealing disk is the molded sealing disk, and the fastener couples the valve plug to the mounting portion without a retainer, a screw head of the fastener being disposed within the recess to secure the valve plug to the mounting portion.

17. The control device of claim 10, wherein the sealing disk is the machined sealing member, and the control device further comprises a retainer in contact with the valve plug to secure the valve plug to the mounting portion, a portion of the retainer disposed within the recess of the valve plug, and a screw head of the fastener disposed within the retainer.

18. The control device of claim 17, the retainer further including a portion in contact with the sealing surface of the valve plug.

19. The control device of claim 10, wherein a distance between each bore is the same.

20. The control device of claim 10, wherein, when the sealing disk is the machined sealing disk, the recess receives a portion of a retainer, and when the sealing disk is the molded sealing disk, the recess receives only a portion of the fastener, such that the same valve plug and one or more fasteners are interchangeably used with both the machined sealing disk and the molded sealing disk.

* * * * *

UNITED STATES PATENT AND TRADEMARK OFFICE
CERTIFICATE OF CORRECTION

PATENT NO. : 10,364,896 B2
APPLICATION NO. : 15/456161
DATED : July 30, 2019
INVENTOR(S) : Chun Lin et al.

It is certified that error appears in the above-identified patent and that said Letters Patent is hereby corrected as shown below:

In the Specification

At Column 4, Line 7, "is cross-sectional" should be -- is a cross-sectional --.

At Column 5, Line 67, "annular flange 248." should be -- annular flange 246. --.

At Column 7, Line 2, "fastener 260" should be -- fastener 259 --.

At Column 7, Line 13, "fasteners 260" should be -- fasteners 259 --.

Signed and Sealed this
Twenty-eighth Day of July, 2020

Andrei Iancu
*Director of the United States Patent and Trademark Office*